Patented Aug. 20, 1940

2,212,385

UNITED STATES PATENT OFFICE 2,212,385

PRODUCING SYNTHETIC DRYING OIL

John S. Brod, Cincinnati, Ohio

No Drawing. Application August 25, 1937,
Serial No. 160,891

14 Claims. (Cl. 260—398)

This invention relates to an improved synthetic drying oil and process of producing the same, the general object being to provide an improved drying oil for use in the manufacture of paints and other analogous coatings possessing the technical properties of a high grade drying oil and which may be readily manufactured in an efficient, simple and economical manner.

Drying oils, such as are used in the paint, varnish and other protective coating industries, may be divided into two general classes: those whose constituent unsaturated fatty acids contain chiefly two or more isolated double bonds (e.g. —CH=CH—CH$_2$—CH=CH—) such as linseed oil and perilla oil, and those whose constituent acids have their double bonds in conjugated positions (e. g. —CH=CH—CH=CH—) such as tung oil and oiticica oil, tung oil and oiticica oil acids containing three conjugated double bonds. Both types of drying oils have certain characteristic and valuable properties, generally recognized in industry, which are to be desired in an ideal drying oil. By making a drying oil which contains both isolated and conjugated double bonds as provided by the present invention, an improved product may be obtained which has the desirable properties conferred by the presence of both isolated and conjugated double bonds, without the undesirable properties which result from a preponderance of either conjugated or isolated double bonds alone.

Castor oil and other hydroxylated fatty oils are not considered to constitute drying oils. However, by chemical treatment, these oils can be converted into satisfactory drying oils containing both isolated and conjugated double bonds, possessing desirable intermediate properties between those of linseed oil and tung oil.

This is attained by removing the elements of water from hydroxylated fatty oils, which removal results in the introduction of new double bonds into the acid chains of the oils at points adjacent to the original position of the hydroxyl group or groups. For example, castor oil is a triglyceride of fatty acids, the principal one of which is the hydroxy unsaturated fatty acid known as ricinoleic acid; since ricinoleic acid comprises approximately 80% of the acids of castor oil, for practical purposes the latter may be represented by the formula:

(CH$_3$(CH$_2$)$_5$CH(OH)CH$_2$CH=
CH(CH$_2$)$_7$COO—)$_3$C$_3$H$_5$

If, by suitable procedure, water be split off from the acid chains at the hydroxyl groups, new double bonds are formed which may take their position between either the 11 and 12 or the 12 and 13 carbon atoms of the acid chains. Actually, in products produced according to my invention, the new double bonds are found in both of these positions. Consequently from castor oil (which has been represented above as the triglyceride of ricinoleic acid, though it is understood that there are small amounts of other fatty acids present also) I obtain an oil which is composed chiefly of the glycerides of isomeric unsaturated acids containing two double bonds, namely:

9,11-octadecadienoic acid

CH$_3$(CH$_2$)$_4$CH$_2$CH=CH—CH=CH(CH$_2$)$_7$COOH

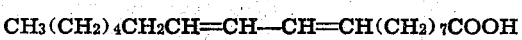

and 9,12-octadecadienoic acid

CH$_3$(CH$_2$)$_4$CH=CH—CH$_2$CH=CH(CH$_2$)$_7$COOH.

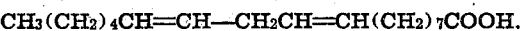

If an hydroxyl group in the acid chain of an oil is immediately adjacent to another hydroxyl group or of a double bond, dehydration may then result in the formation of a triple bond or of allenic or conjugated double bonds.

Heretofore, the only practical method of making synthetic drying oils composed of the glycerides of unsaturated acids which result from dehydration has been to first prepare the free hydroxylated fatty acids, then dehydrate them by some means (such as heating with or without a catalyst and followed by distillation in vacuo), and finally reesterifying the newly formed unsaturated acids with glycerol or other polyhydric alcohol. The products obtained by this procedure do have desirable qualities for use in the paint and varnish industries, but the method heretofore used, as just outlined, is unnecessarily complicated and costly.

I have discovered that the preparation of a synthetic drying oil containing both isolated and conjugated double bonds can be readily and practically accomplished by removing the elements of water from castor oil or other hydroxylated fatty oil. In the case of my invention this is effected by heating the hydroxylated fatty oil with a volatile organic acid, its anhydride or acid chloride, such as acetic acid, acetic anhydride or acetyl chloride, which process results in esterification of the hydroxyl groups in the fatty oil, and then heating the acylated oil to a higher temperature (such as 250-275° C.), preferably in an inert atmosphere such as carbon dioxide and under reduced pressure. At these higher temperatures, the acid which previously esterified the hydroxyl group of the oil is split off, thus introducing a new double bond which may be either conjugated to or isolated from the double bond or bonds already present in the acid chains of the oil. The volatile organic acid which is split off at the higher temperatures distills out of the reaction mixture and may be collected and reused for acylation of the hydroxylated fatty oil after suitable concentration and purification.

The presence of conjugated double bonds in a synthetic oil prepared in accordance with my invention may be demonstrated by determining the "diene value" of the oil by the well known procedure of Kaufmann and Baltes: Fette und Seifen 43, 93 (1936).

The oily products thus obtained from dehydration of hydroxylated fatty oils are light in color and are suitable for use directly in paint and other protective coating preparations. By controlling the temperature and time of heating of the acylated oil, a variety of products may be obtained which have distinctive properties and are particularly suited for certain uses. Thus, by controlling the temperature and time of heating of the acylated oil so that not all of the volatile organic acid (which was attached to the oil by esterification of hydroxyl groups) is split off and removed, a partially acylated and unsaturated product is obtained which may be used as a plasticizer in nitrocellulose lacquers and similar preparations. Or, if heating of the acylated oil is carried out, for example for several hours at 270° C., so that practically all of the acid added by esterification is split out and removed, a low viscosity drying oil is obtained which may be used in paint, varnish, and similar preparations in place of linseed and/or tung oils. By prolonging the heating of this new drying oil after all the acid added by previous esterification has been removed, for example for several hours or more at 300° C., a polymerized drying oil or stand oil is obtained which has a high viscosity and is suitable for use in varnishes and also as a plasticiser in lacquers and similar coatings. Moreover, both the synthetic drying oil itself and the free unsaturated fatty acids prepared from it may be used with suitable other materials, such as glycerol and phthalic anhydride, for the preparation of modified alkyd resins.

It is to be understood that the above specified conditions are not the only ones which may be used to obtain products of technical value; a range of heating temperatures and times may be employed to split off the acid and form new double bonds in the oil, depending on the particular qualities desired in the product. Furthermore, it is to be understood that the above cited uses are not the only ones possible for the reaction products.

The following examples illustrate the manner in which the invention may be specifically practiced, though it is to be understood that neither the methods of practicing nor the applications of the invention are to be limited to the specific examples given.

*Example I*

Castor oil is heated with a two- or three-fold excess of acetic anhydride for several hours at refluxing temperature under atmospheric pressure. After esterification in this manner, the excess acetic anhydride and the acetic acid formed during the reaction are removed by continuing the heating under reduced pressure. Then, with a stream of inert gas (such as carbon dioxide) bubbling through the acetylated castor oil or with the pressure within the reaction flask reduced below atmospheric, or both, the temperature of the oil is raised to above 250° C. and maintained between 250 and 270° C. for 3 or 4 hours. During this heating, a low-boiling liquid distills off; this distillate is a mixture of acetic acid which has been split off from the acetylated castor oil together with small amounts of acrolein and other decomposition products. The product remaining in the reaction vessel is a clear light yellow oil. It will dry to a clear firm film, and may be used directly as a drying oil, with or without the customary driers, in paint, varnish and enamel preparations (where tung oil or linseed and similar oils are ordinarily used).

*Example II*

Castor oil which has been acetylated in the manner described in Example I is heated (either under reduced pressure or with an inert gas bubbling through it, or both) for several hours between 250 and 270° C. and then for 1 or 2 hours more at 300° C. A mixture of low-boiling liquids distills off as in Example I during this treatment. The product of this heat treatment has the same clear light yellow appearance as the product in Example I but has a considerably higher viscosity. It is a more completely deacetylated product than that of Example I, and is partially polymerized (in the usual manner of heat-bodied drying oils). It will air-dry, without driers, to a crystalline film. It may be used in place of or in addition to heat-bodied tung oil or linseed and similar oils in the preparation of varnishes. Also, this product may be used in lacquers and synthetic enamels as both a plasticiser and a film-forming constituent.

By the term hydroxylated fatty oil is meant an oil or fat, either natural or synthetic, which is composed of glycerides of fatty acids which contain one or more hydroxyl groups in the acid chain. These acid chains may or may not already contain one or more double bonds. Examples of such hydroxy fatty acids are ricinoleic acid:

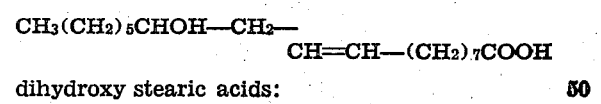

dihydroxy stearic acids:

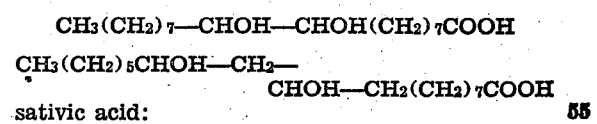

sativic acid:

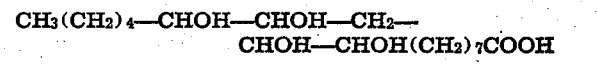

Acylated oils from which the above described products may be obtained may also be prepared by reacting a salt of a volatile acid, e. g. sodium acetate, with a glyceride of a halogen substituted fatty acid such as dichlorostearic acid; in this case esterification is accompanied by the elimination of a salt such as sodium chloride.

What is claimed is:

1. In a process of producing an unsaturated fatty oil, the step which consists in subjecting a volatile-organic-acid ester of a fatty oil to a temperature above 250° C. but not above 300 C. for several hours whereby volatile organic acid is split off and volatilized and a new double bond is formed in a fatty acid chain of the fatty oil.

2. The process of claim 1 in which the volatile-organic-acid ester is subjected to the temperature of splitting and volatilization in the presence of an inert gas.

3. The process of claim 1 in which the volatile-organic-acid ester is subjected to the temperature of splitting and volatilization at a pressure within the group of pressures consisting of atmospheric pressure and subatmospheric pressure.

4. The process of producing from a hydroxylated fatty oil a fatty oil having a greater degree of unsaturation which comprises acylating the said hydroxylated fatty oil at an alcoholic hydroxyl group with more than catalytic amounts of an acylating agent to form a volatile-organic-acid ester and subjecting the acylated product to heat treatment at a temperature above 250° C. but not above 300° C. for several hours to split off and volatilize the said volatile organic acid and thereby form a new double bond in a fatty acid chain of the fatty oil.

5. In the process of producing a fatty drying oil, the step which consists in subjecting a volatile-organic-acid ester of a fatty oil, which ester is unsaturated in the fatty acid chains of the fatty oil, to a temperature above 250° C. but not above 300° C. for several hours whereby volatile organic acid is split off and volatilized with the formation of new double bonds in the fatty acid chains of the oil.

6. The process of producing a fatty drying oil from castor oil, which comprises acylating castor oil at alcoholic hydroxyl groups with more than catalytic amounts of an acylating agent to form a volatile-organic-acid ester and subjecting the acylated product to heat treatment at a temperature above 250° C. but not above 300° C. for several hours to split off and volatilize the said volatile organic acid and thereby form a product composed chiefly of glycerides of a mixture of isomeric unsaturated fatty acids containing two double bonds.

7. The process of producing a fatty drying oil having both isolated and conjugated double bonds, which comprises esterifying alcoholic hydroxyl groups of castor oil with more than catalytic amounts of a compound selected from the group consisting of volatile organic acids, their acid halides, and their acid anhydrides and subjecting the resulting product to heat treatment for several hours at a temperature higher than that employed in the esterification step and above 250° C. but not about 300° C. whereby volatile organic acid is split off and volatilized and new double bonds are formed in the fatty acid chains of the oil.

8. In the process of producing a fatty drying oil, the step which consists in subjecting a glyceride of dihydroxy stearic acid, which has been substantially completely acylated to form a volatile-organic-acid ester thereof, to a temperature above 250° C. but not above 300° C. for several hours whereby volatile organic acid is split off and volatilized with the simultaneous formation of double bonds.

9. In the process of producing a fatty drying oil from a glyceride of sativic acid, the step which consists in subjecting a glyceride of sativic acid, at least two alcoholic hydroxyl groups of which have been acylated to form a volatile-organic-acid ester, to a temperature above 250° C. but not above 300° C. for several hours whereby volatile organic acid is split off and volatilized with the simultaneous formation of double bonds.

10. In a process of producing a fatty drying oil from castor oil, the step which consists in subjecting acetylated castor oil to heat treatment for several hours at a temperature above 250° C. but not above 300° C. whereby acetic acid is split off and volatilized to form new double bonds in the fatty acid chains of the oil.

11. The process of producing from a hydroxylated fatty oil a fatty oil having a greater degree of unsaturation which comprises acylating hydroxyl groups of said hydroxylated fatty oil with more than catalytic amounts of an acylating agent to form a volatile-organic-acid ester and subjecting the acylated product to heat treatment at a temperature above 250° C. but not above 300° C. for several hours to split off and volatilize substantially all the volatile organic acid and thereby form new double bonds in the oil.

12. In the process of producing a polymerized fatty drying oil, the steps which consist in subjecting a volatile-organic-acid ester of a fatty oil, which ester is unsaturated in the fatty acid chains of the oil, to heat treatment at a temperature above 250° C. but not above 300° C. for several hours whereby volatile organic acid is split off and volatilized with the formation of new double bonds in the fatty acid chains of the oil and prolonging said heat treatment for several hours more to effect polymerization of the deacylated product.

13. The process of producing a fatty drying oil from castor oil, which comprises acylating castor oil at alcoholic hydroxyl groups with more than catalytic amounts of an acylating agent to form a volatile-organic-acid ester and subjecting the acylated product to heat treatment at a temperature of about 270° C. for several hours to split off and volatilize the said volatile organic acid and thereby form a product composed chiefly of glycerides of a mixture of isomeric unsaturated fatty acids containing two double bonds.

14. The process of producing from a hydroxylated fatty oil a fatty oil having a greater degree of unsaturation which comprises acylating hydroxyl groups of said hydroxylated fatty oil with more than catalytic amounts of an acylating agent to form a volatile-organic-acid ester and subjecting the acylated product to heat treatment at a temperature above 250° C. but not above 300° C. for several hours, the time and temperature conditions being so adjusted as to split off and volatilize part of the combined volatile organic acid and thereby form a partially acylated and unsaturated product.

JOHN S. BROD.